United States Patent [19]

Manzoni

[11] Patent Number: 4,512,633
[45] Date of Patent: Apr. 23, 1985

[54] VEHICLE REARVIEW MIRROR REMOTE-CONTROL DEVICE

[75] Inventor: Stephane Manzoni, Saint Claude, France

[73] Assignee: Manzoni-Bouchot, France

[21] Appl. No.: 366,034

[22] Filed: Apr. 6, 1982

[30] Foreign Application Priority Data

Apr. 10, 1981 [FR] France ............................... 81 07272

[51] Int. Cl.³ .............................................. G02B 7/18
[52] U.S. Cl. .................................. 350/632; 74/501 M
[58] Field of Search ....................... 350/289; 74/501 M

[56] References Cited

U.S. PATENT DOCUMENTS

| | | | |
|---|---|---|---|
| 4,101,206 | 7/1978 | Oskam et al. ........................ | 350/289 |
| 4,150,585 | 4/1979 | Manzoni ........................... | 74/501 M |
| 4,245,893 | 1/1981 | Lafont et al. ....................... | 350/289 |

Primary Examiner—John K. Corbin
Assistant Examiner—Lynn Vandenburgh Kent
Attorney, Agent, or Firm—Remy J. VanOphem

[57] ABSTRACT

The present invention relates to a vehicle rearview mirror remote-control device, mounted in a casing containing a control mechanism including a support member integral with the body of a vehicle and which extends inside the casing through an opening. The support member has a first axis around which is pivotally mounted a cross-piece, on which cross-piece is pivotally mounted the casing carrying the mirror, on a second axis perpendicular to the first, first movement-controlling means being provided between the support member and the cross-piece and second-movement controlling means being provided, in an offset manner with respect to the second axis, between the cross-piece and the casing.

4 Claims, 11 Drawing Figures

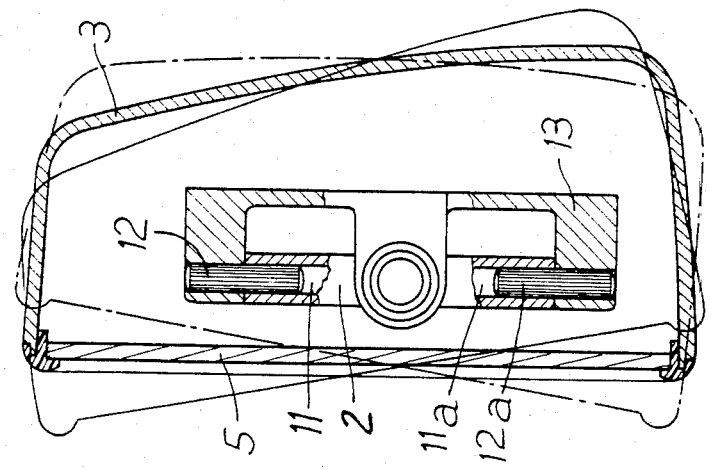
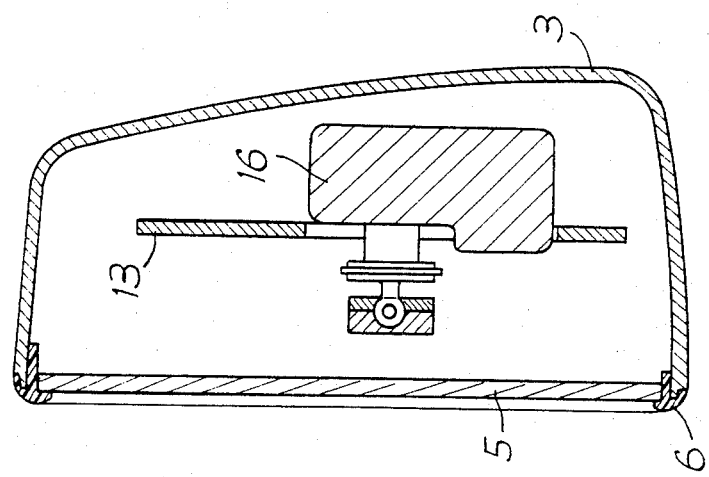
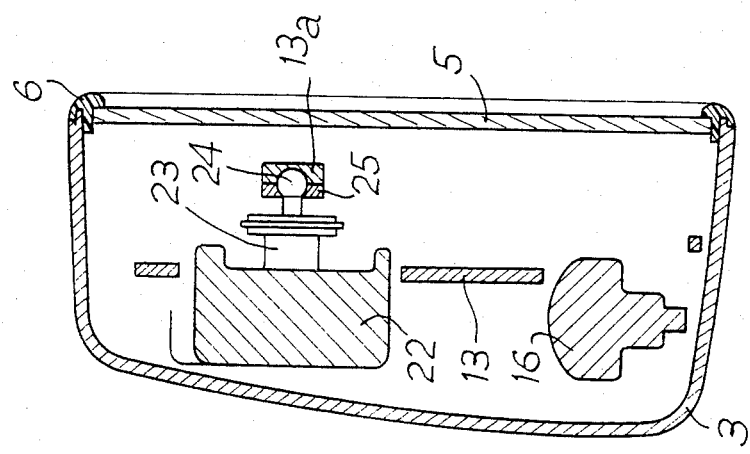

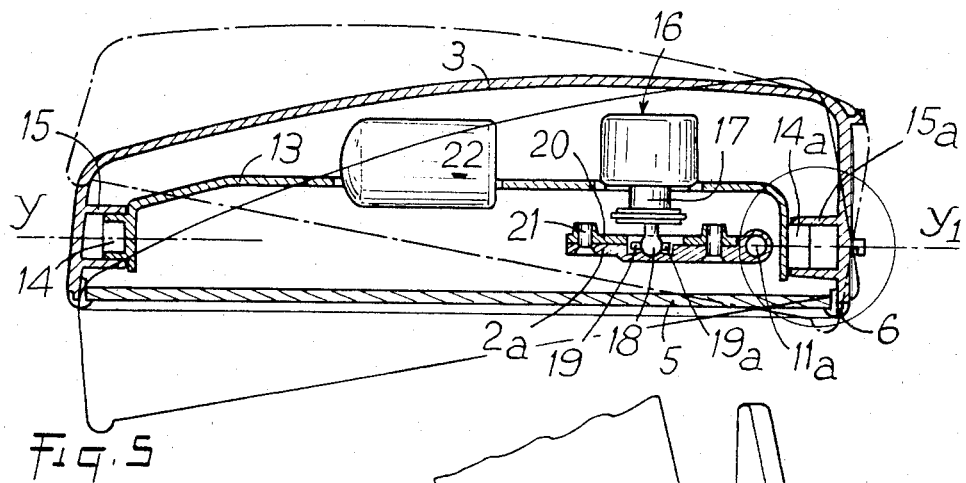
Fig. 5
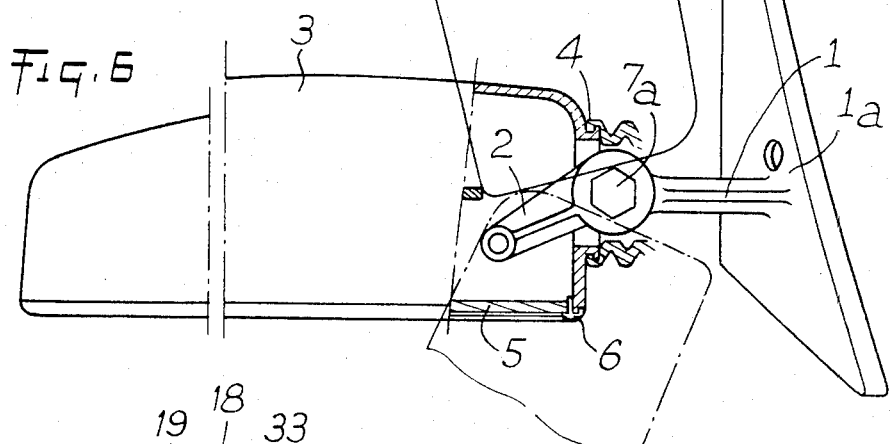
Fig. 6
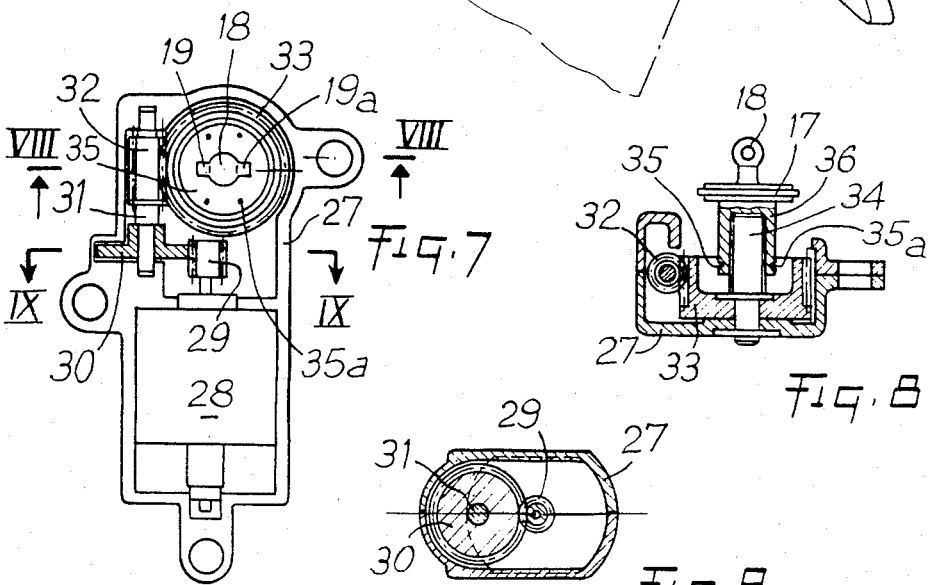
Fig. 7
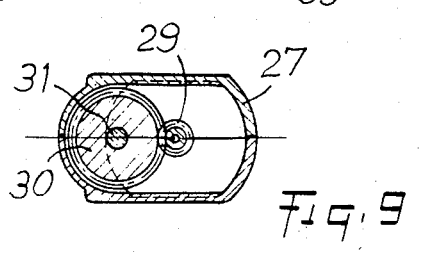
Fig. 8
Fig. 9

VEHICLE REARVIEW MIRROR REMOTE-CONTROL DEVICE

BACKGROUND OF THE INVENTION

1. Cross Reference To Related Case

This application is related to my commonly-owned U.S. patent application Ser. No. 366,015, filed Apr. 6, 1982, and entitled "Vehicle Rearview Mirror Remote-Control Device".

2. Field of the Invention

The present invention relates to a device for remotely-controlling a vehicle rearview mirror.

3. Description of the Prior Art

It is known to use rearview mirrors in which the remotely controlled mirror is movably mounted in its casing, together with the pivoting and control means, and therein controlled by an electric motor or hand-operated control.

These rearview mirrors however are not entirely satisfactory in providing internal protection against dust or inclement weather conditions.

It is known to use a device which includes a support member integral with the body of the vehicle and which extends inside the casing through an opening. The support member has a first axis around which is pivotally mounted a cross-piece. The casing carrying the mirror is pivotably mounted on the cross-piece along a second axis perpendicular to the first.

First movement-controlling means are provided between the support member and the cross-piece, and second movement-controlling means are provided, in an offset manner with respect to the second axis, between the cross-piece and the casing.

SUMMARY OF THE INVENTION

In this device, the mirror is sealingly, rigidly secured to the casing such that a seal is obtained against dust and/or inclement weather. A gusset of very simple design closes off the opening provided in the casing to allow the angular spring movement of the casing.

According to the present invention, the support member includes a two part arm, the parts of which are connected together by a dog clutch type setting back member. One part of the arm is secured to the vehicle body. The second part extends inside the casing and includes two bearings along the vertical axis. The cross-piece is mounted on two pins from the second arm part to pivot about the vertical axis and is provided with two pivots disposed along a horizontal axis and engaged in bearings provided on the casing.

The mechanism being mounted as aforesaid inside the casing, the casing can be of a relatively slim design.

Finally, such a rearview mirror can be mounted on a vehicle door or on the gusset of a vehicle door.

The invention will be more readily understood on reading the following description with reference to the accompanying drawings in which:

BRIEF DESCRIPTION OF THE DRAWINGS

FIG. 2 is a view partially in cross-section along line II—II of FIG. 1;

FIG. 3 is a view partially in cross-section along line III—III of FIG. 1;

FIG. 4 is a view partially in cross-section along line IV—IV of FIG. 1;

FIG. 5 is a view partially in cross-section along line V—V of FIG. 1;

FIG. 6 is a plan view partially in cross-section along line VI—VI of FIG. 1;

FIG. 7 is a longitudinal cross-section of one embodiment of the means controlling the displacement;

FIG. 8 is a cross-section along line VIII—VIII of FIG. 7;

FIG. 9 is a cross-section along line IX—IX of FIG. 7; and

DETAILED DESCRIPTION OF THE PREFERRED EMBODIMENT

Figure 1:
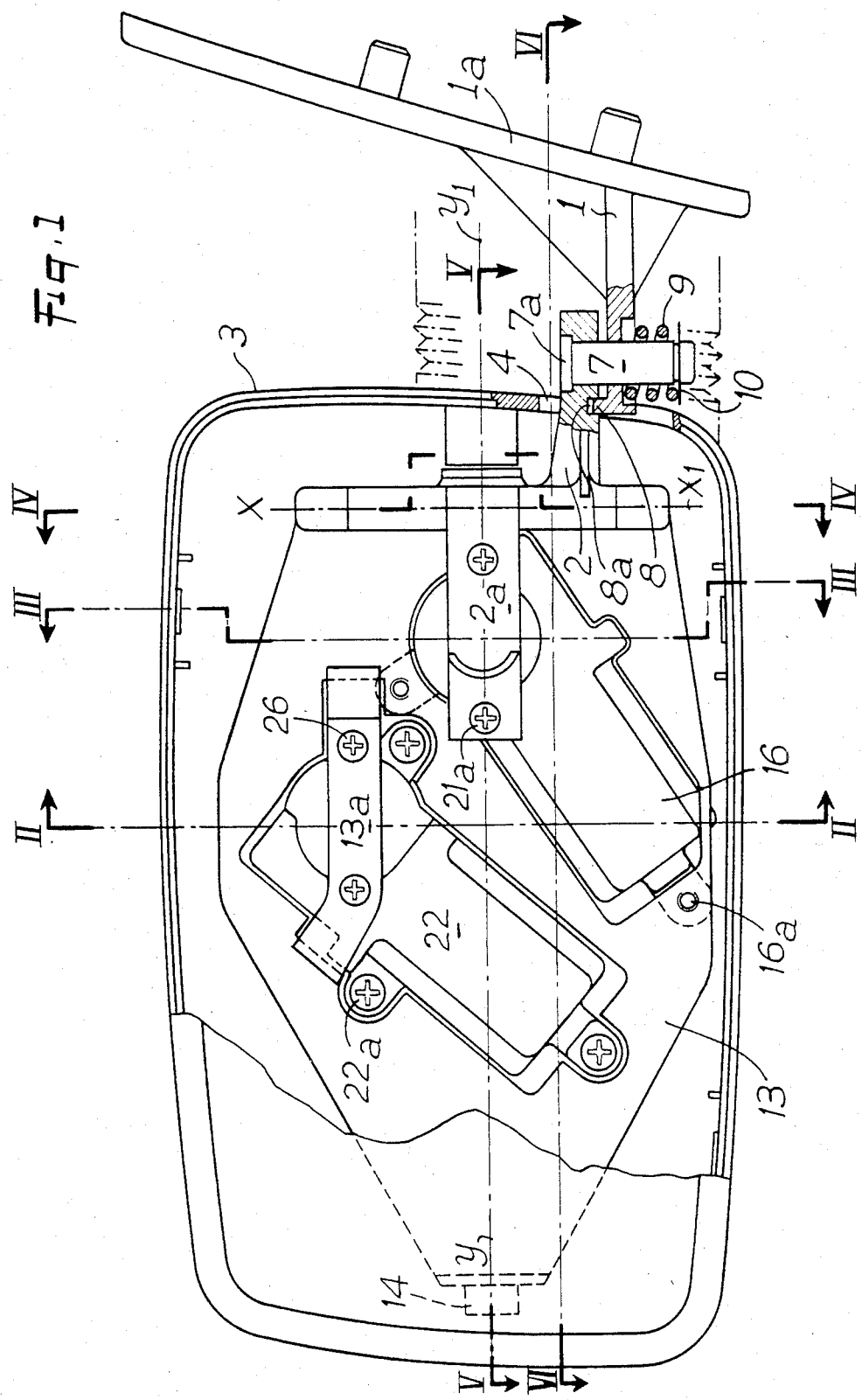
FIG. 1 is an elevational view partially in cross-section of an embodiment of the rearview mirror according to the invention.

FIGS. 1 to 6 show an embodiment of the rearview mirror of a vehicle and, in particular, a rearview mirror designed to be mounted on the gusset of the vehicle door.

The device includes a support member of which one part 1 is equipped with a plate 1a designed to be secured to the vehicle door the other part 2 extending inside a rearview mirror casing 3 through an opening 4 in the casing. The casing is provided on its front face with a mirror 5 positioned by means of a mirror holding ring 6.

One part 1 of the support member is joined to part 2 by a rod 7 of which the head 7a is of hexagonal shape and is integral with the other part 2 of the support member. The rod 7 is mounted for rotation in the one part 1 of the support member and presents at least one dog-clutch type member 8 engaged in a notch 8a of the other part 2 under the action of a spring 9 resting on one side against the one part 1 of the support member and on the other side against a washer 10 engaged in a groove of the rod 7 (FIGS. 1 and 6). The other part 2 of the support member, situated inside the casing, presents two bores 11 and 11a in which two pins 12 and 12a are pivotally mounted by one of their ends, the pins being fastened at their other end to a cross-piece 13 as shown in FIG. 4.

As may be better understood with reference to FIG. 5, the cross-piece 13 is mounted for pivoting about a first or vertical axis $XX_1$ on the other part 2 of the support member and is provided at its two ends with pivots 14 and 14a which are engaged in cylindrical recesses or bearings 15 and 15a provided inside the casing 3. The pivots 14 and 14a and bearings 15 and 15a are arranged along the same axis so that the casing 3 is mounted for pivoting on the cross-piece 13 about a second or horizontal axis $YY_1$.

First control means 16 for controlling the movement of the cross-piece with respect to the other part 2 of the support member are mounted by way of screws 16a on the cross-piece 13.

The first control means 16, to be described hereinafter in more detail, includes a movable head 17, with a ball joint 18 provided with two lugs 19 and 19a. The ball joint is located inside a recess provided between an arm 2a, integral with the support member, and a plate 20 secured to the arm 2a by way of screws 21 as shown in FIGS. 1 and 3. The ball joint 18 is disposed along axis $YY_1$ to cause the cross-piece 13 to pivot about the axis $XX_1$ with respect to the other part 2 of the support member. A second control means 22 is likewise mounted by way of screws 22a on the bottom of the casing 3 and has a movable head 23, shown in FIGS. 1, 2 and 5, which includes a ball joint 24 provided with two lugs as recited above. The ball joint is inside a spherical recess provided between an arm 13a integral with the cross-piece 13 and a plate 25 secured to the arm by way of screws 26.

FIGS. 7, 8 and 9 show an embodiment of the first control means 16 and the second control means 22, each one consisting of a case 27 containing an electric motor 28 of which the output shaft 29 rotates a pinion 30 wedged on a spindle 31 mounted for rotation inside the case 27. The spindle 31 is shaped as an endless worm or screw 32 which meshes with a tangential worm wheel 33 which is fixed to rotate with a helical-threaded rod 34. One end of the helical-threaded rod 34 is rotatably secured to the case 27. The other end of the helical-threaded rod 34 is engaged by two elastic stirrup-pieces 35 and 35a integral with a sleeve 36 placed around the helical-threaded rod 34. The movable head 17 or 23 of the sleeve 36 carries the ball joint 18 or 24, provided with lugs 19 and 19a.

The device operates as follows. The powering of the motor 28 rotates the output shaft 29, the pinion 30, the endless screw 32, the tangential worm wheel 33, and the helical-threaded rod 34. The helical threads of the rod 34 rotate in the stirrup-pieces 35 and 35a and the sleeve 36 to drivingly translate the sleeve axially.

In consequence, by actuating the first control means 16, the cross-piece 13 is moved with respect to the other part 2 of the support member so that the cross-piece 13 and the casing 3, carrying the mirror 5, move about the first or vertical axis $XX_1$ with a left to right movement as viewed in the Figures.

Moreover, by actuating the second control means 22, the casing 3 carrying the mirror is moved about the axis $YY_1$ in a face-up to face-down movement.

Figure 10:
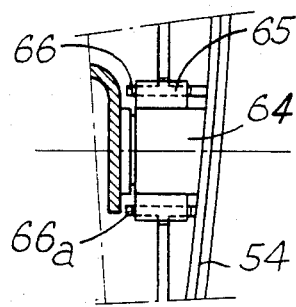
FIGS. 10 and 10a are cross-sectional views showing the detail of an embodiment of the bearings.
Figure 10A:
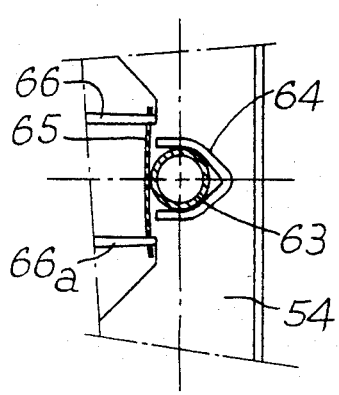

According to another embodiment illustrated in FIGS. 10 and 10a, the cross-piece, not shown, is provided in its middle part with two pivots 63, only one of which is shown in FIGS. 10 and 10a, mounted for pivoting in a recess 64, of the casing, the recess being open on one side. The pivots 63 are held in position, for example, by a resilient steel strip 65, resting against support members 66 and 66a fixed to the casing 54.

Thus, the casing 54 is mounted for pivoting about a horizontal axis $YY_1$ on a cross-piece, not shown.

Although control means using electric motors have been illustrated, it is obvious that the movement of the members of the rearview mirror can be controlled by any other mechanical means and in particular by a cable actuated from inside the vehicle by a hand-operated control.

The invention is in no way limited to the description given hereinabove and, on the contrary, various modifications can be made thereto without departing from the scope thereof.

What is claimed is:

1. A rearview mirror remote-control device for controlling the movement of a mirror about a vertical axis and a horizontal axis comprising:
   a hollow mirror casing having a front face mounting said mirror, an inboard and an outboard lateral side, a support means aperture through said inboard lateral side, and inboard and outboard casing bearing means mounted within said hollow mirror casing to define said horizontal axis therethrough;
   support means having a body end adapted to be secured to a body of a vehicle and a casing end extending through said support means aperture into said hollow mirror casing, said casing end comprising support bearing means defining and locating said vertical axis within said hollow mirror casing substantially closer to one side of said inboard and outboard lateral sides than to the other of said sides, said support means further comprising a first support arm comprising said body end, a second support arm comprising said casing end, and clutch means pivotably coupling said first and second support arms for normally preventing relative movement therebetween until a torque greater than a predetermined torque is applied to one of said first and said second support arms whereby said casing end is allowed to move relative to said body end only when a torque greater than said predetermined torque is applied to said hollow mirror casing;
   cross-piece means pivotably secured to said inboard and outboard casing bearing means so as to allow a vertical pivoting about said horizonal axis and further being pivotably supported by said support means so as to allow a horizontal pivoting about said vertical axis, whereby said horizontal pivoting of said cross-piece means about said vertical axis also pivots said hollow mirror casing thereabout;
   vertical movement controlling means mounted to one of said hollow mirror casing and said cross-piece means for controlling said vertical pivoting of said hollow mirror casing relative to said cross-piece means about said horizontal axis; and
   horizontal movement controlling means mounted to one of said support means and said cross-piece means for controlling said horizontal pivoting of said cross-piece means and said hollow mirror casing relative to said support means about said vertical axis.

2. The rearview mirror remote-control device of claim 1, wherein said horizontal and vertical movement controlling means are each disposed between said vertical axis and said outboard casing bearing means.

3. A rearview mirror remote-control device for controlling the movement of a mirror about a vertical axis and a horizontal axis comprising:
   a hollow mirror casing having a front face mounting said mirror, an inboard and an outboard lateral side, a support means aperture through said inboard lateral side, and inboard and outboard casing bearing means respectively mounted to an inside surface of each of said inboard and outboard lateral sides within said hollow mirror casing to define said horizontal axis therethrough;
   support means having a vehicle end adapted to be secured to a body of a vehicle and a casing end extending through said support means aperture into said hollor mirror casing, said casing end comprising support bearing means defining and locating said vertical axis within said hollow mirror casing substantially closer to one side of said inboard and outboard lateral sides than to the other said sides, whereby said other side may swing through a substantially greater distance about said vertical axis than said one side, said support means further comprising clutch means;
   cross-piece means pivotably secured to said inboard and outboard casing bearing means so as to allow a vertical pivoting about said horizontal axis and further being pivotably supported by said support means so as to allow a horizontal pivoting about said vertical axis, whereby a horizontal pivoting of said cross-piece means about said vertical axis also pivots said hollow mirror casing thereabout;

vertical movement controlling means mounted to one of said hollow mirror casing and said cross-piece means for controlling said vertical pivoting of said hollow mirror casing relative to said cross-piece means about said horizontal axis; and horizontal movement controlling means mounted to one of said support means and said cross-piece means for controlling said horizontal pivoting of said cross-piece means and said hollow mirror casing relative to said support means about said vertical axis.

4. The rearview mirror remote-control device of claim 3, wherein said horizontal and vertical movement controlling means are both disposed between said vertical axis and said outboard casing bearing means.

* * * * *

UNITED STATES PATENT AND TRADEMARK OFFICE
CERTIFICATE OF CORRECTION

PATENT NO.  : 4,512,633
DATED       : April 23, 1985
INVENTOR(S) : Stephane Manzoni It is certified that error appears in the above-identified patent and that said Letters Patent is hereby corrected as shown below:

Column 4, line 9, before "second" insert ---- said ----.

Column 4, line 55, delete "hollor" and insert ---- hollow ----.

Signed and Sealed this

Tenth Day of September 1985

[SEAL]

Attest:

DONALD J. QUIGG

*Attesting Officer*   Acting Commissioner of Patents and Trademarks - Designate